US011885241B1

(12) United States Patent
Rogers et al.

(10) Patent No.: US 11,885,241 B1
(45) **Date of Patent: *Jan. 30, 2024**

(54) TURBINE NOZZLE ASSEMBLY WITH STRESS RELIEF STRUCTURE FOR MOUNTING RAIL

(71) Applicant: General Electric Company, Schenectady, NY (US)

(72) Inventors: Lauren Elizabeth Rogers, Greenville, SC (US); William Scott Zemitis, Simpsonville, SC (US); Kristen Barbara Coletti, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,221

(22) Filed: Jul. 28, 2022

(51) Int. Cl.
*F01D 9/04* (2006.01)
*F01D 11/00* (2006.01)
*F01D 5/14* (2006.01)

(52) U.S. Cl.
CPC ............... *F01D 9/041* (2013.01); *F01D 5/14* (2013.01); *F01D 5/147* (2013.01); *F01D 9/042* (2013.01); *F01D 11/005* (2013.01); *F05D 2240/128* (2013.01); *F05D 2260/30* (2013.01)

(58) Field of Classification Search
CPC . F01D 9/041; F01D 5/14; F01D 5/147; F01D 9/042; F01D 11/005; F05D 2240/128; F05D 2260/30
See application file for complete search history.

(56) References Cited

U.S. PATENT DOCUMENTS 3,781,125 A * 12/1973 Rahaim .................... F01D 9/042 415/115
5,071,313 A * 12/1991 Nichols .................... F01D 11/08 415/173.3
7,097,422 B2 * 8/2006 Rice .......................... F01D 5/34 415/134
7,293,957 B2 * 11/2007 Ellis ......................... F01D 9/041 415/138
10,024,170 B1 * 7/2018 Memmen ................ F01D 5/087
(Continued)

OTHER PUBLICATIONS

Office Action dated Mar. 16, 2023 for U.S. Appl. No. 17/876,225, filed Jul. 28, 2023; pp. 11.

*Primary Examiner* — Brian Christopher Delrue
(74) *Attorney, Agent, or Firm* — James Pemrick; Charlotte Wilson; Hoffman Warnick LLC

(57) ABSTRACT

A turbine nozzle assembly includes at least one airfoil and an outer endwall coupled to a radial outer end of the at least one airfoil. A mounting rail is coupled to the outer endwall and extends at least partially radially outward from the outer endwall and at least partially circumferentially along the outer endwall. A stress relief structure is defined in the mounting rail. The stress relief structure includes an end opening defined in a radial outer surface of the mounting rail, a slot defined through the rail thickness of the mounting rail and coupled to the end opening, and an oblong opening defined through the rail thickness of the mounting rail and coupled to a radial inner end of the slot. The oblong opening is arranged asymmetrically in a circumferential direction relative to the slot to relieve stress where prevalent in the mounting rail.

20 Claims, 12 Drawing Sheets

(56) References Cited

U.S. PATENT DOCUMENTS

| | | | | |
|---|---|---|---|---|
| 2007/0122275 | A1 | 5/2007 | Busch et al. | |
| 2007/0166154 | A1 | 7/2007 | Ellis et al. | |
| 2014/0363284 | A1 | 12/2014 | Feldmann et al. | |
| 2016/0146024 | A1 * | 5/2016 | Morris | B23P 15/006<br>228/104 |
| 2017/0321560 | A1 | 11/2017 | Balawajder et al. | |
| 2019/0017397 | A1 * | 1/2019 | Uecker | F01D 9/041 |

* cited by examiner

TURBINE NOZZLE ASSEMBLY WITH STRESS RELIEF STRUCTURE FOR MOUNTING RAIL

TECHNICAL FIELD

The disclosure relates generally to turbine systems and, more particularly, to a turbine nozzle assembly for a turbine including a stress relief structure for a mounting rail of the turbine nozzle assembly.

BACKGROUND

Turbine systems include stages of rotating blades and stationary nozzles, the latter of which direct a working fluid towards the rotating blades to cause them to rotate. A series of circumferentially spaced turbine nozzle assemblies collectively form a nozzle section or stage of the turbine system. Each turbine nozzle assembly includes one or more mounting rails coupled to a radially outer endwall. The radially outer endwall is coupled to a radially inner endwall by an airfoil. The mounting rail(s) is coupled to a stationary casing of the turbine. The mounting rail(s) can experience high stresses. FIG. 1 shows a side view of a conventional stress relief structure 10 in a mounting rail 12. Stress relief structure 10 has a symmetrical arrangement. The symmetrical arrangement does not relieve stress where most pronounced in mounting rail 12.

BRIEF DESCRIPTION

All aspects, examples and features mentioned below can be combined in any technically possible way.

An aspect of the disclosure provides a turbine nozzle assembly, comprising: at least one airfoil; an inner endwall coupled to a radial inner end of the at least one airfoil; an outer endwall coupled to a radial outer end of the at least one airfoil; a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including: an end opening defined in the radial outer surface of the mounting rail; a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot.

Another aspect of the disclosure includes any of the preceding aspects, and the at least one airfoil includes a first airfoil to a first circumferential side of the slot, and a second airfoil circumferentially spaced from the first airfoil to a second circumferential side of the slot, wherein the stress relief structure is circumferentially closer to the second airfoil than the first airfoil.

Another aspect of the disclosure includes any of the preceding aspects, and the oblong opening includes a first circumferential extent to the first circumferential side of the slot that is smaller than a second circumferential extent to the second circumferential side of the slot.

Another aspect of the disclosure includes any of the preceding aspects, and the oblong opening includes: a first planar surface extending circumferentially to the first circumferential side of the slot; a second planar surface extending circumferentially to the second circumferential side of the slot; and a rounded surface connecting the first planar surface and the second planar surface.

Another aspect of the disclosure includes any of the preceding aspects, and the rounded surface includes a plurality of connected arced surfaces, each arced surface having a different radius of curvature.

Another aspect of the disclosure includes any of the preceding aspects, and a first arced surface of the rounded surface adjacent the first planar surface has a first radius of curvature smaller than a second radius of curvature of a second arced surface of the rounded surface adjacent the second planar surface.

Another aspect of the disclosure includes any of the preceding aspects, and further comprises: a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

Another aspect of the disclosure includes any of the preceding aspects, and the mounting rail is coupled to the outer endwall adjacent an axially trailing edge of the outer endwall.

Another aspect of the disclosure includes any of the preceding aspects, and the turbine nozzle assembly is in a second stage of a turbine system.

An aspect of the disclosure includes a turbine nozzle assembly, comprising: a first airfoil adjacent a second airfoil; an inner endwall coupled to a radial inner end of the first airfoil and the second airfoil; an outer endwall coupled to a radial outer end of the first airfoil and the second airfoil; a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including: an end opening defined in the radial outer surface of the mounting rail; a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot.

Another aspect of the disclosure includes any of the preceding aspects, and the first airfoil is to a first circumferential side of the slot, and the second airfoil is circumferentially spaced from the first airfoil and to a second circumferential side of the slot, wherein the stress relief structure is circumferentially closer to the second airfoil than the first airfoil.

Another aspect of the disclosure includes any of the preceding aspects, and the oblong opening includes a first circumferential extent to the first circumferential side of the slot that is smaller than a second circumferential extent to the second circumferential side of the slot.

Another aspect of the disclosure includes any of the preceding aspects, and the oblong opening includes: a first planar surface extending circumferentially to the first circumferential side of the slot; a second planar surface extending circumferentially to the second circumferential side of the slot; and a rounded surface connecting the first planar surface and the second planar surface.

Another aspect of the disclosure includes any of the preceding aspects, and the rounded surface includes a plurality of connected arced surfaces, each arced surface having a different radius of curvature.

Another aspect of the disclosure includes any of the preceding aspects, and a first arced surface of the rounded surface adjacent the first planar surface has a first radius of curvature smaller than a second radius of curvature of a second arced surface of the rounded surface adjacent the second planar surface.

Another aspect of the disclosure includes any of the preceding aspects, and further comprises: a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

Another aspect of the disclosure includes any of the preceding aspects, and the mounting rail is coupled to the outer endwall adjacent an axially trailing edge of the outer endwall.

Another aspect of the disclosure includes any of the preceding aspects, and the turbine nozzle assembly is in a second stage of a turbine system.

An aspect of the disclosure includes a turbine system, comprising: a plurality of nozzle stages, at least one nozzle stage of the plurality of nozzle stages including at least one turbine nozzle assembly comprising: at least one airfoil; an inner endwall coupled to a radial inner end of the at least one airfoil; an outer endwall coupled to a radial outer end of the at least one airfoil; a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including: an end opening defined in the radial outer surface of the mounting rail; a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot.

Another aspect of the disclosure includes any of the preceding aspects, and the at least one nozzle stage includes a second stage of the turbine system.

An aspect of the disclosure may include a turbine nozzle assembly, comprising: at least one airfoil; an outer endwall coupled to a radial outer end of the at least one airfoil; a mounting rail coupled to the outer endwall, the mounting rail extending at least partially radially outward from the outer endwall and at least partially circumferentially along the outer endwall, the mounting rail having a radial outer surface, a rail thickness and an origin at a rearwardmost point on a pressure side, circumferential end of the mounting rail; and a stress relief structure defined in the mounting rail, the stress relief structure including an oblong opening defined through the rail thickness of the mounting rail, the oblong opening having a portion having a shape having a nominal profile defined by a plurality of arced surfaces defined substantially in accordance with Cartesian coordinate values of Y and Z and radius of curvature set forth in TABLE I, originating at the origin and projecting through the rail thickness of the mounting rail in a direction parallel to an X-axis of the turbine, wherein the Cartesian coordinate values are non-dimensional values of from 0% to 100% convertible to distances by multiplying the values by a minimum X-wise extent of the rail thickness of the mounting rail, and wherein Y and Z values are joined smoothly with one another to form a surface profile of the portion of the oblong opening through the rail thickness of the mounting rail in the direction parallel to the X-axis of the turbine.

Another aspect of the disclosure includes any of the preceding aspects, and the stress relief structure further includes: an end opening defined in the radial outer surface of the mounting rail; and a slot defined through the rail thickness of the mounting rail and coupled to the end opening, and wherein the oblong opening is coupled to a radial inner end of the slot, the oblong opening being arranged asymmetrically in a circumferential direction relative to the slot.

Another aspect of the disclosure includes any of the preceding aspects, and the at least one airfoil includes a first airfoil to a first circumferential side of the slot and a second airfoil circumferentially spaced from the first airfoil to a second circumferential side of the slot, wherein the stress relief structure is circumferentially closer to the second airfoil than the first airfoil.

Another aspect of the disclosure includes any of the preceding aspects, and further comprising: a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

Another aspect of the disclosure includes any of the preceding aspects, and the mounting rail is coupled to the outer endwall adjacent an axially trailing edge of the outer endwall.

Another aspect of the disclosure includes any of the preceding aspects, and the turbine nozzle assembly is in a second stage of a turbine system.

An aspect of the disclosure relates to a turbine nozzle assembly, comprising: at least one airfoil; an outer endwall coupled to a radial outer end of the at least one airfoil; a mounting rail coupled to the outer endwall, the mounting rail extending at least partially radially outward from the outer endwall and at least partially circumferentially along the outer endwall, the mounting rail having a radial outer surface, a rail thickness and an origin at a rearwardmost point on a pressure side, circumferential end of the mounting rail; and a stress relief structure defined in the mounting rail, the stress relief structure including an oblong opening defined through the rail thickness of the mounting rail, the oblong opening having a portion having a shape having a nominal profile substantially in accordance with Cartesian coordinate values of X, Y, and Z values set forth in TABLE II and originating at the origin, wherein the Cartesian coordinate values are non-dimensional values of from 0% to 100% convertible to distances by multiplying the values by a minimum X-wise extent of the rail thickness of the mounting rail, and wherein X, Y, and Z values are joined smoothly with one another to form a surface profile of the portion of the oblong opening.

Another aspect of the disclosure includes any of the preceding aspects, and the stress relief structure further includes: an end opening defined in the radial outer surface of the mounting rail; and a slot defined through the rail thickness of the mounting rail and coupled to the end opening, and wherein the oblong opening is coupled to a radial inner end of the slot, the oblong opening being arranged asymmetrically in a circumferential direction relative to the slot.

Another aspect of the disclosure includes any of the preceding aspects, and the at least one airfoil includes a first airfoil to a first circumferential side of the slot and a second airfoil circumferentially spaced from the first airfoil to a second circumferential side of the slot, wherein the stress relief structure is circumferentially closer to the second airfoil than the first airfoil.

Another aspect of the disclosure includes any of the preceding aspects, and further comprising: a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

Another aspect of the disclosure includes any of the preceding aspects, and the mounting rail is coupled to the outer endwall adjacent an axially trailing edge of the outer endwall.

Another aspect of the disclosure includes any of the preceding aspects, and the turbine nozzle assembly is in a second stage of a turbine system.

An aspect of the disclosure includes a turbine nozzle assembly, comprising: at least one airfoil; an outer endwall coupled to a radial outer end of the at least one airfoil; a mounting rail coupled to the outer endwall, the mounting rail extending at least partially radially outward from the outer endwall and at least partially circumferentially along the outer endwall, the mounting rail having a radial outer surface, a rail thickness and an origin at a rearwardmost point on a pressure side, circumferential end of the mounting rail; and a stress relief structure defined in the mounting rail, the stress relief structure including an oblong opening defined through the rail thickness of the mounting rail, the oblong opening having a portion having a shape having a nominal profile substantially in accordance with Cartesian coordinate values of Y and Z values set forth in TABLE II, originating at the origin, and projecting through the rail thickness of the mounting rail in a direction parallel to an X-axis of the turbine, wherein the Cartesian coordinate values are non-dimensional values of from 0% to 100% convertible to distances by multiplying the values by a minimum X-wise extent of the rail thickness of the mounting rail, and wherein Y and Z values are joined smoothly with one another to form a surface profile of the portion of the oblong opening through the rail thickness of the mounting rail in the direction parallel to the X-axis of the turbine.

Another aspect of the disclosure includes any of the preceding aspects, and the stress relief structure further includes: an end opening defined in the radial outer surface of the mounting rail; and a slot defined through the rail thickness of the mounting rail and coupled to the end opening, and wherein the oblong opening is coupled to a radial inner end of the slot, the oblong opening being arranged asymmetrically in a circumferential direction relative to the slot.

Another aspect of the disclosure includes any of the preceding aspects, and the at least one airfoil includes a first airfoil to a first circumferential side of the slot and a second airfoil circumferentially spaced from the first airfoil to a second circumferential side of the slot, wherein the stress relief structure is circumferentially closer to the second airfoil than the first airfoil.

Another aspect of the disclosure includes any of the preceding aspects, and further comprising: a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

Another aspect of the disclosure includes any of the preceding aspects, and the mounting rail is coupled to the outer endwall adjacent an axially trailing edge of the outer endwall.

Another aspect of the disclosure includes any of the preceding aspects, and the turbine nozzle assembly is in a second stage of a turbine system.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
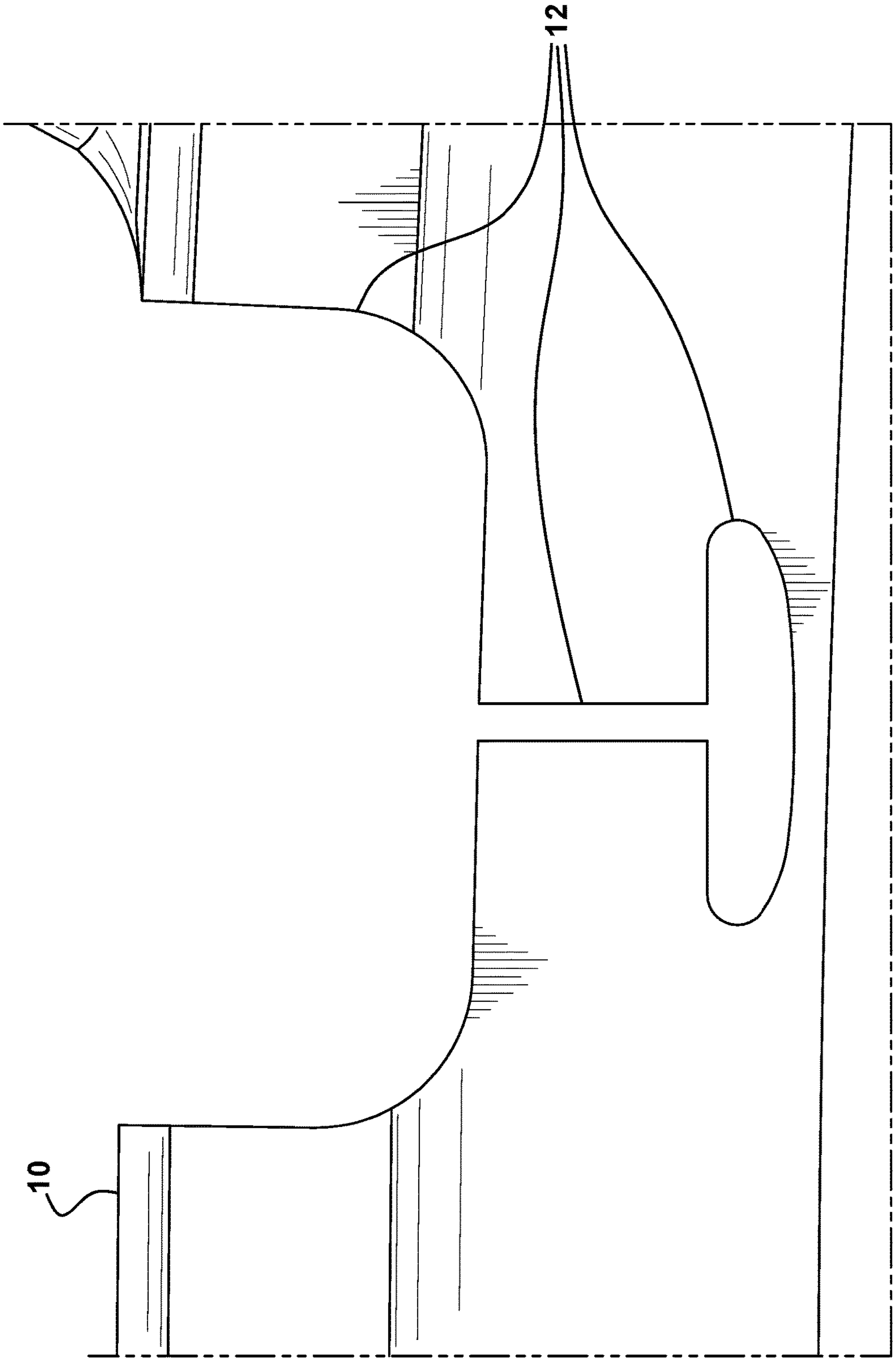
FIG. 1 (Prior Art)
FIG. 1 shows a side view of a conventional stress relief structure 10 in a mounting rail 12.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., a turbine shaft. Finally, the term "circumferential" refers to movement or position around an axis. It will be appreciated that such terms may be applied in relation to the center axis of the turbine. Some drawings include a legend indicating radial (Z), axial (X), and circumferential (Y) directions. Where Cartesian coordinates are used, the arrowheads of the legends indicate the positive directions.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a turbine nozzle assembly and a turbine system including the turbine nozzle assembly. The turbine nozzle assembly includes at least one airfoil and an outer endwall coupled to a radial outer end of the at least one airfoil. The turbine nozzle assembly also includes a mounting rail coupled to the radial outer endwall, the mounting rail extending at least partially radially outward from the outer endwall and at least partially circumferentially along the outer endwall. The mounting rail also has a radial outer surface and a rail thickness. A stress relief structure is defined in the mounting rail. The stress relief structure includes an end opening defined in the radial outer surface of the mounting rail, and a slot defined through the rail thickness of the mounting rail and coupled to the end opening. The stress relief structure also includes an oblong opening defined through the rail thickness of the mounting rail and coupled to a radial inner end of the slot. The oblong opening may be arranged asymmetrically in a circumferential direction relative to the slot to relieve stress where it is highest. A portion of the oblong opening may also be more specifically defined according to various embodiments of the disclosure, described herein, to relieve stress where it is highest.

Figure 2:
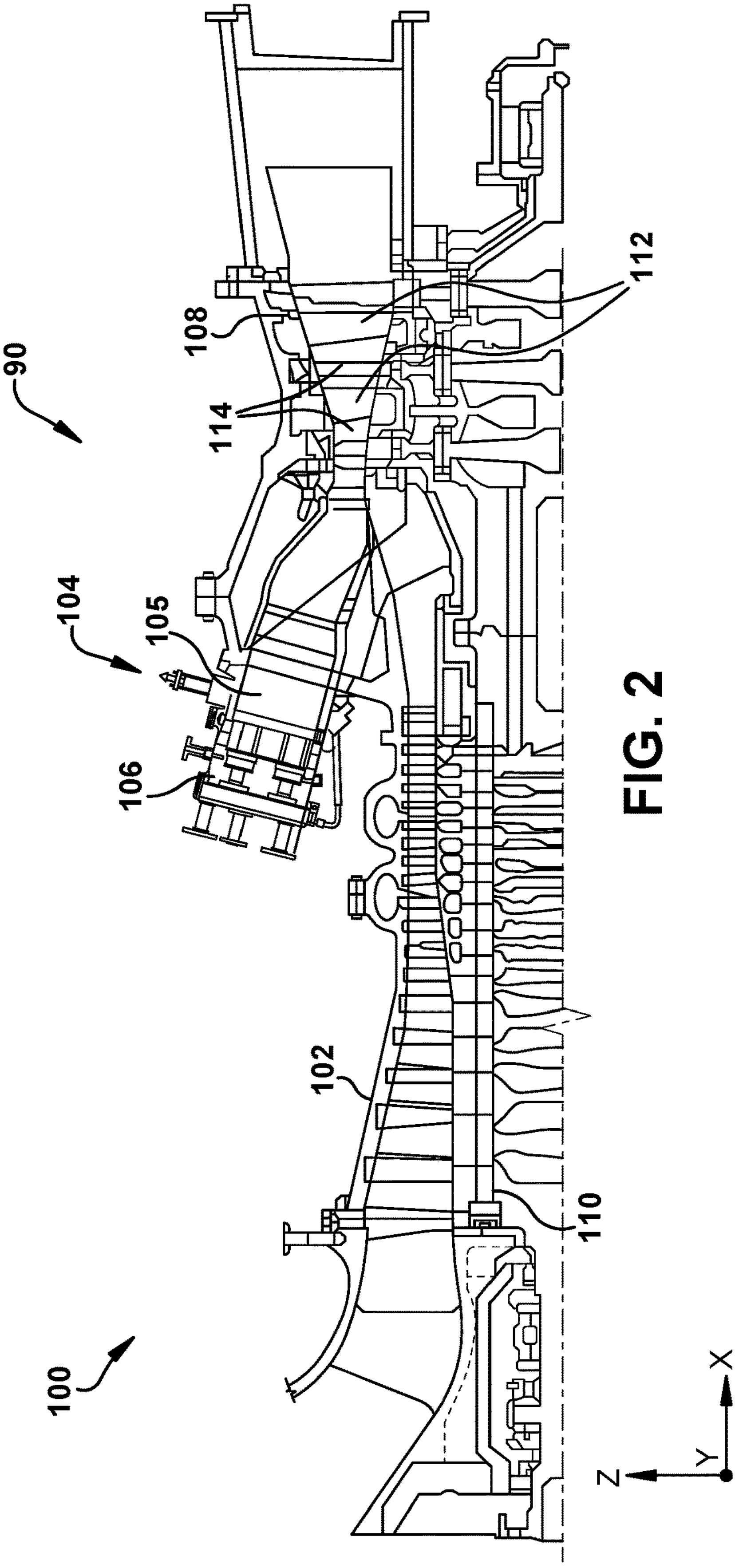
FIG. 2 shows a simplified cross-sectional view of an example turbomachine.

Referring to the drawings, FIG. 2 is a schematic view of an illustrative turbomachine 90 in the form of a combustion turbine or gas turbine (GT) system 100 (hereinafter, "GT system 100"). GT system 100 includes a compressor 102 and a combustor 104. Combustor 104 includes a combustion region 105 and a fuel nozzle assembly 106. GT system 100 also includes a turbine 108 and a common compressor/turbine shaft 110 (hereinafter referred to as "rotor 110").

In one embodiment, GT system 100 is a 7HA.02 engine, commercially available from General Electric Company, Greenville, S.C. The present disclosure is not limited to any one particular GT system or turbine system and may be implanted in connection with other engines including, for example, the other HA, F, B, LM, GT, TM and E-class engine models of General Electric Company and engine models of other companies. Further, the teachings of the disclosure are not necessarily applicable to only a GT system and may be applied to other types of turbomachines, e.g., steam turbines, jet engines, compressors, etc.

Figure 3:
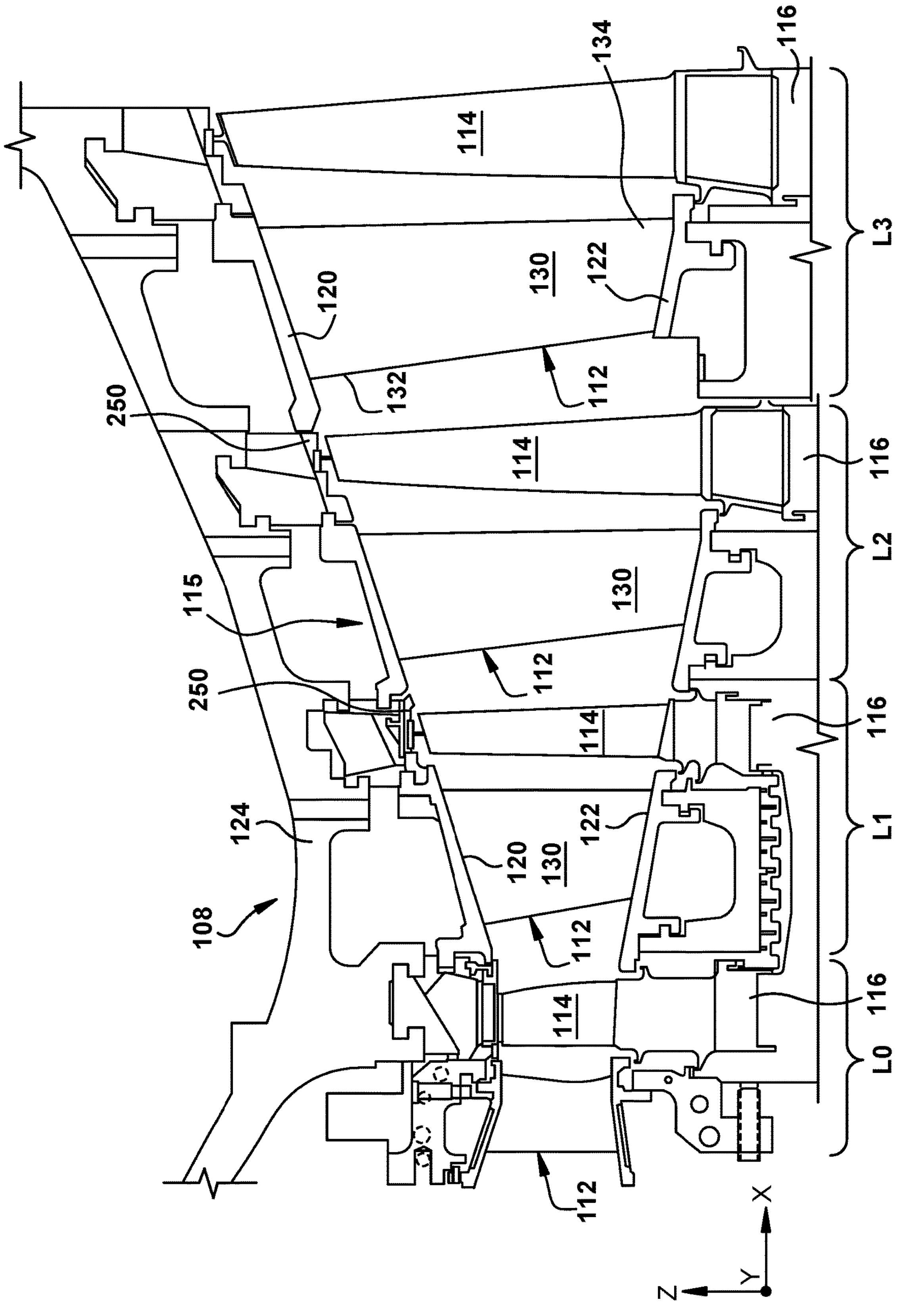
FIG. 3 shows a cross-sectional view of an example four-stage turbine that may be used with the turbomachine in FIG. 2.

FIG. 3 shows a cross-sectional view of an illustrative portion of turbine 108 with four stages L0-L3 that may be used with GT system 100 in FIG. 2. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one example only, and each turbine may have more or less than four stages.

A set of stationary vanes or nozzle assemblies 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor 110 (FIG. 2). That is, a plurality of rotating blades 114 are mechanically coupled in a circumferentially spaced manner to each rotor wheel 116. A static nozzle section or stage 115 includes a plurality of stationary nozzle assemblies 112 circumferentially spaced around rotor 110. Each turbine nozzle assembly 112 (hereafter "nozzle assembly 112") may include endwalls (or platforms) 120, 122 connected with at least one airfoil 130. In the example shown, nozzle assemblies 112 include a radially outer endwall 120 coupled to a radial outer end 132 of airfoil(s) 130. Nozzle assemblies 112 may also include a radially inner endwall 122 coupled to a radial inner end 134 of airfoil(s) 130. Radially outer endwall 120 couples each nozzle assembly 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 2) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106. In the following discussion, unless otherwise indicated, only one of each component will be discussed. At least one end of rotor 110 may extend axially away from turbine 108 and may be attached to a load or machinery (not shown), such as, but not limited to, a generator, a load compressor, and/or another turbine.

Figure 4:
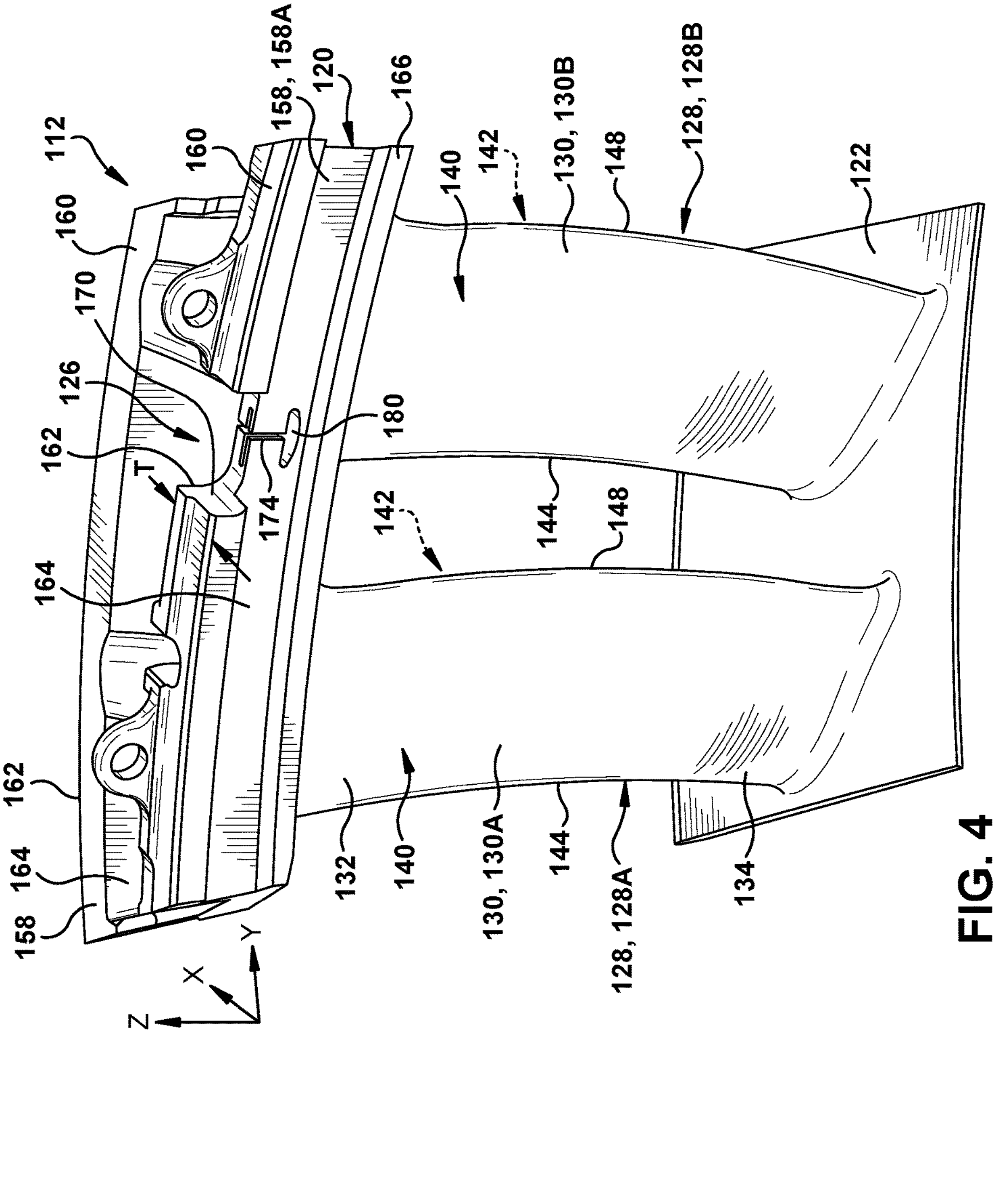
FIG. 4 shows a forward-looking perspective view of an illustrative turbine nozzle assembly including a stress relief structure, according to embodiments of the disclosure.
Figure 5:
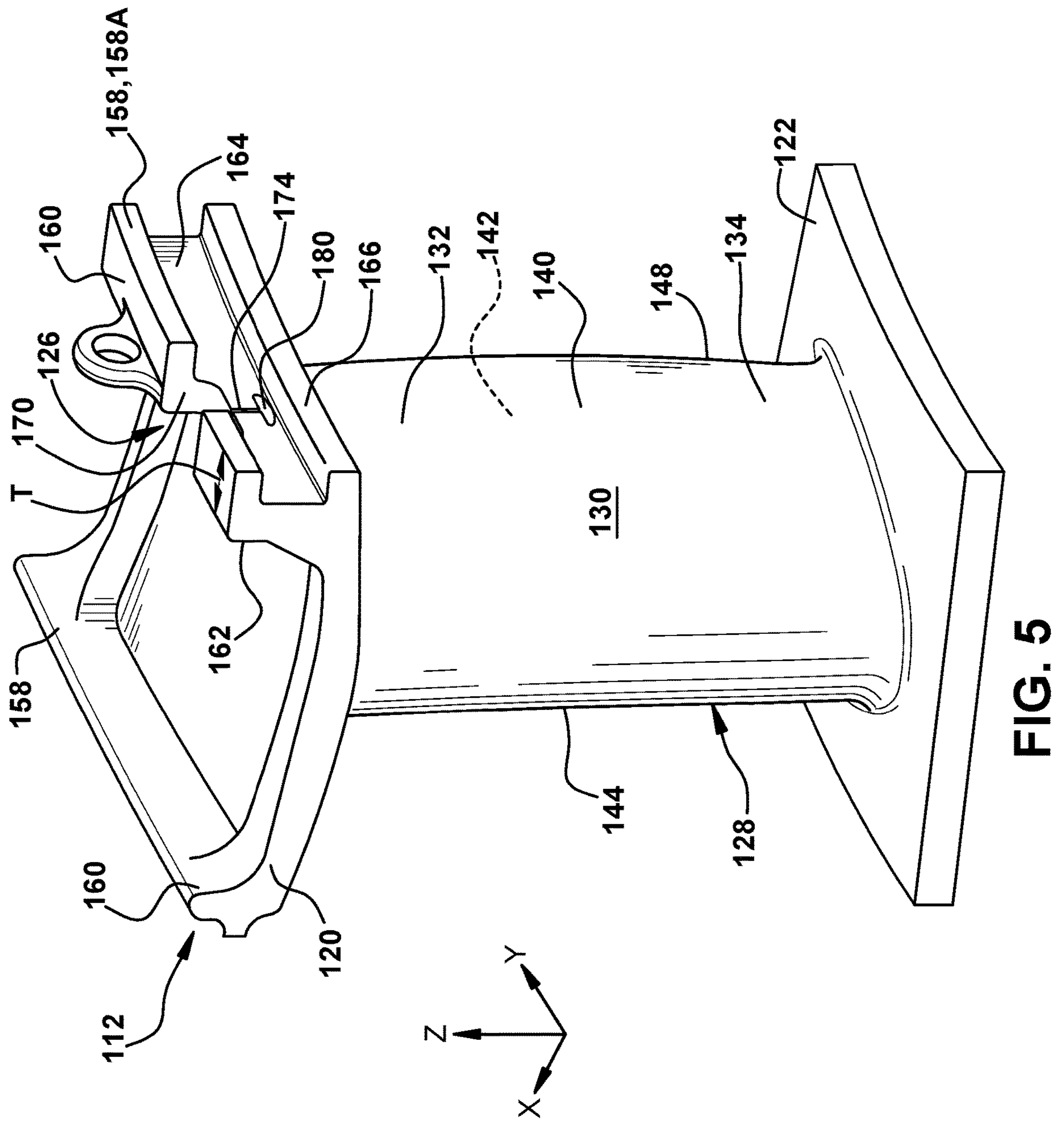
FIG. 5 shows a side perspective view of an illustrative turbine nozzle assembly including a stress relief structure, according to other embodiments of the disclosure.

Turning to FIGS. 4 and 5, perspective views of a turbine vane or nozzle assembly 112 including a stress relief structure 126 is shown, according to various embodiments. FIG. 4 shows a forward-looking perspective view of a nozzle assembly 112 including more than one nozzle 128, e.g., two nozzles; and FIG. 5 shows a side perspective view of a nozzle assembly 112 with a single nozzle 128. Nozzle assembly 112 may include any number of nozzles 128 (i.e., airfoils 130 connected to at least an outer endwall 120). In any event, nozzle assembly 112 is stationary and forms part of static nozzle section or stage 115 (FIG. 3) and part of an annulus of stationary nozzle assemblies 112 (FIG. 3) in a stage of a turbine 108, as previously described. During operation of turbine 108 (FIG. 3), nozzle(s) 128 in each nozzle assembly 112 remain stationary in order to direct the flow of working fluid (e.g., gas or steam) to one or more movable blades (e.g., blades 114), causing those movable blades to initiate rotation of a rotor 110 (FIG. 2). It is understood that each nozzle assembly 112 may be configured to couple (mechanically couple via fasteners, welds, slot/grooves, etc.) with a plurality of similar or distinct nozzle assemblies 112 to form an annulus of nozzles 128 in a stage L0-L3 (FIG. 3) of turbine 108 (FIGS. 2-3).

Turbine nozzle assembly 112 can include any number of nozzles 128 with each nozzle 128 including an airfoil 130. Hence, each turbine nozzle assembly 112 may include at least one airfoil 130. Each airfoil 130 may have a convex suction side 140 and a concave pressure side 142 (the latter obstructed in FIGS. 4 and 5) opposing suction side 140. Each airfoil 130 in a nozzle assembly 112 can also include a leading edge 144 spanning between pressure side 142 and suction side 140 and a trailing edge 148 opposing leading edge 144 and spanning between pressure side 142 and suction side 140. FIG. 4 shows an embodiment with two nozzles 128A, 128B and, hence, a first airfoil 130A and a second airfoil 130B. FIG. 5 shows an embodiment with one nozzle 128 and, hence, only one airfoil 130.

Nozzle assembly 112 can also include at least one endwall 120, 122 (two shown) connected with airfoil(s) 130 along suction side 140, pressure side 142, trailing edge 148 and leading edge 144. In the examples shown, nozzle assembly 112 includes radially outer endwall 120 and radially inner endwall 122. Radially outer endwalls 120 are configured to align on the radially outer side of the static nozzle section 115 (FIG. 3) and to couple respective nozzle assemblies 112 to casing 124 (FIG. 3) of turbine 108 (FIG. 3). Radially inner endwalls 122 are configured to align on the radially inner side of static nozzle section 115 (FIG. 3) to define the radially inward boundary of the hot gas path through turbine 108.

Each nozzle assembly 112 also includes a mounting rail 158 coupled to outer endwall 120 for mounting the nozzle assembly to casing 124 (FIG. 3). Two mounting rails 158 are shown, for example, in FIGS. 4 and 5. Each mounting rail 158 extends at least partially radially outward from outer endwall 120, i.e., in the Z direction; some of the rail may be below an outer surface of outer endwall. Each mounting rail 158 also extends at least partially circumferentially along outer endwall 120, i.e., in the Y direction. Each mounting rail 158 has a radial outer surface 160, a forward surface 162, an aft surface 164, and a rail thickness T between forward and aft surfaces 162, 164. Thickness T of each mounting rail may vary radially, e.g., via protrusions on forward surface 162 and/or aft surface 164. Surfaces 162, 164 can have any shape required for mounting nozzle assembly 112 in casing 124 (FIG. 3). In some cases, mounting rails 158 may be referred to as 'hooks' due to their hooked shape.

Stress in one or more mounting rails 158 can require maintenance. To address the stress, embodiments of the disclosure employ a stress relief structure 126 in one or more mounting rails 158 of nozzle assembly 112. Typically, stress relief structure 126 is implemented only in an aft mounting rail 158A that is coupled to outer endwall 120 adjacent an axially trailing edge 166 of outer endwall 120, but it can be used in any mounting rail 158 in one or more nozzle assemblies 112 of turbine 108. For purposes of description, stress relief structure 126 will be described relative to aft mounting rail 158A.

Figure 6:
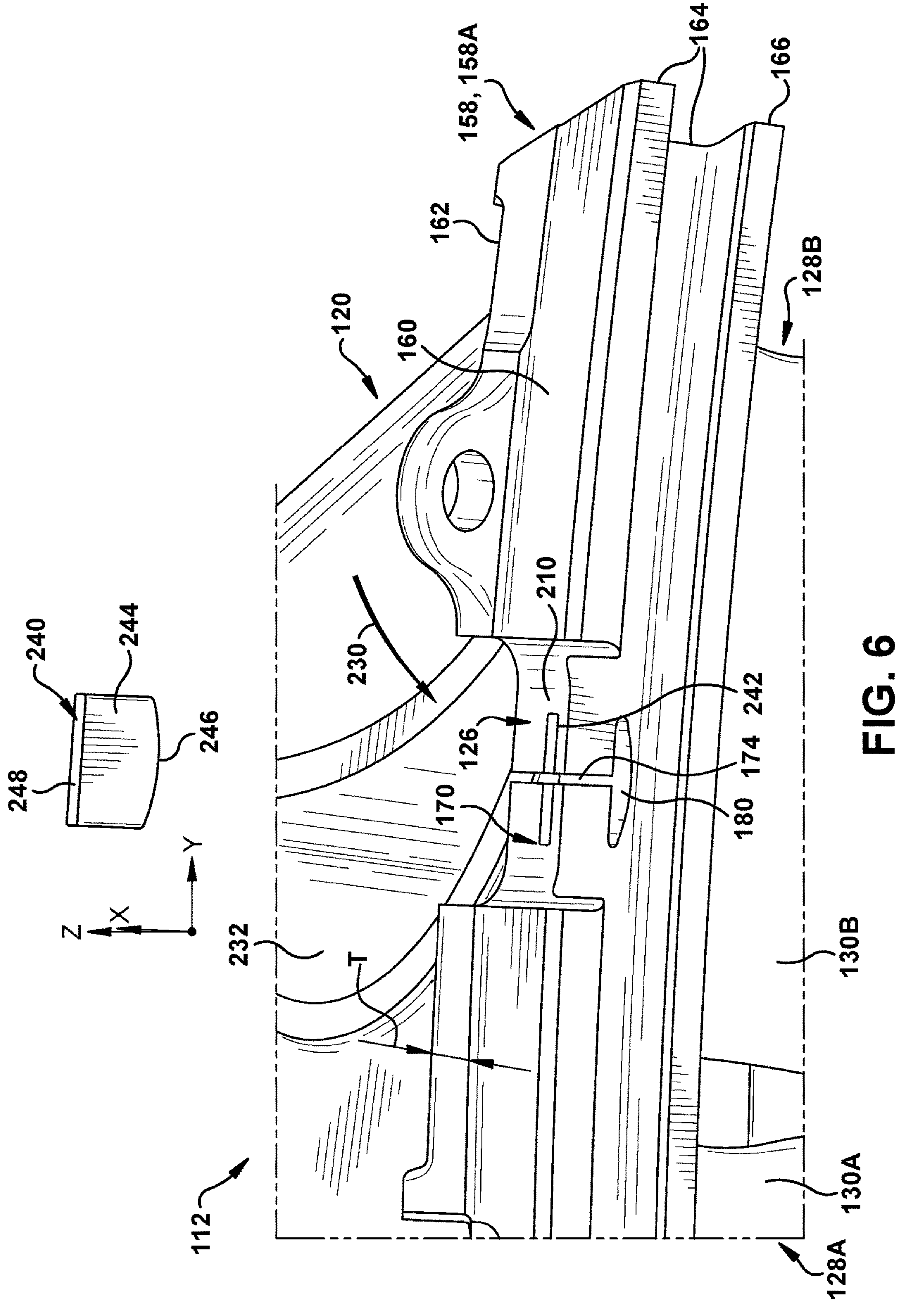
FIG. 6 shows a forward and downward-looking perspective view of a stress relief structure in a mounting rail of a turbine nozzle assembly, according to embodiments of the disclosure.
Figure 7:
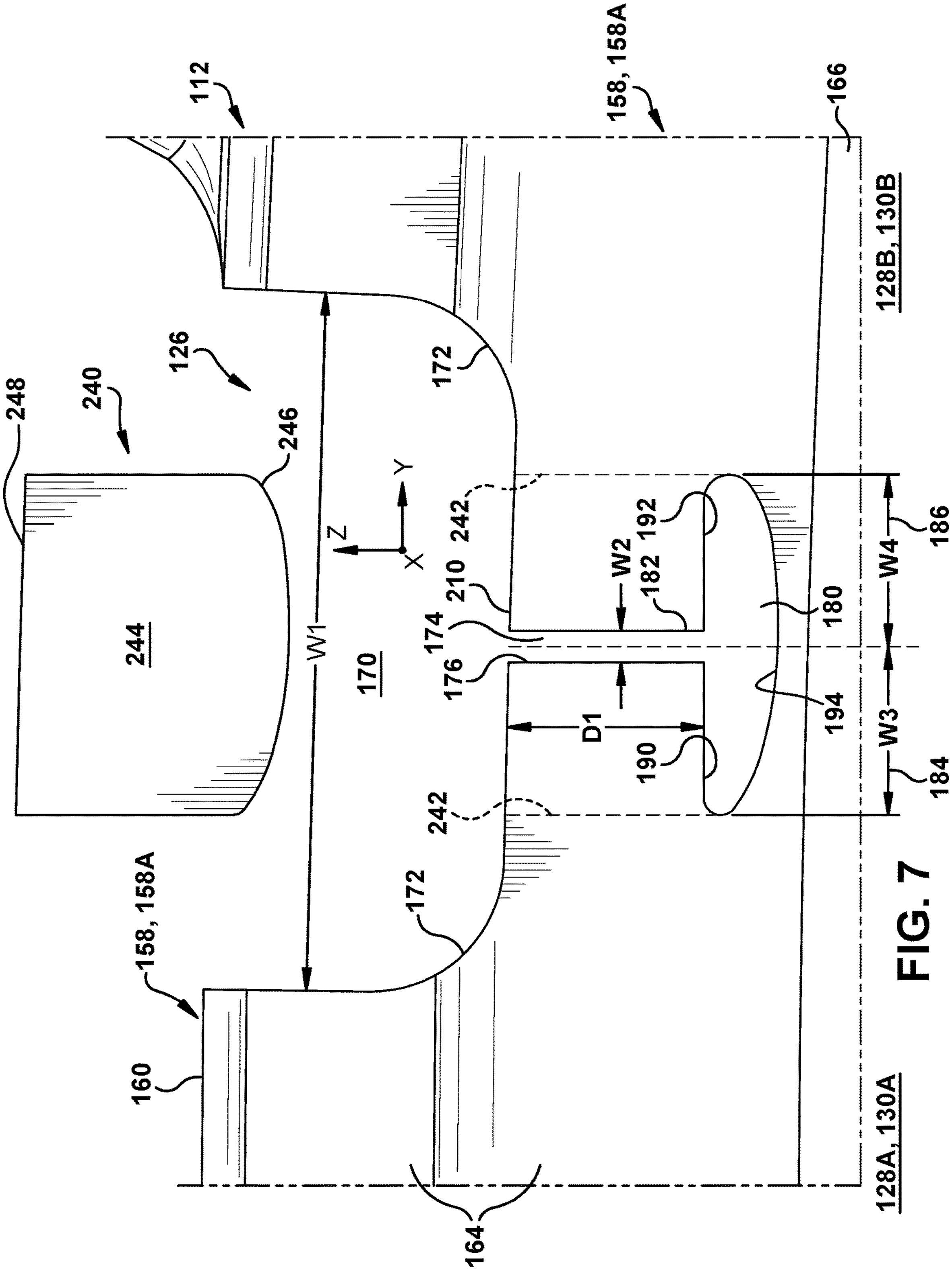
FIG. 7 shows a rear view of a stress relief structure in a mounting rail of a turbine nozzle assembly, according to embodiments of the disclosure.

FIGS. 6 and 7 show a forward and downward-looking perspective view and a rear view, respectively, of stress relief structure 126 in mounting rail 158A, according to embodiments of the disclosure. Stress relief structure 126 may be located anywhere along a circumferential extent of mounting rail 158 where stress relief is desired. In one embodiment, as shown in FIG. 4, where first airfoil 130A and second airfoil 130B are employed in nozzle assembly 112, stress relief structure 126 is circumferentially closer to second airfoil 130B than first airfoil 130A. That is, in a circumferential length of mounting rail 158A between airfoils 130A, 130B, stress relief structure 126 is positioned closer to second airfoil 130B. In the example shown in FIGS. 4 and 6, stress relief structure 126 is closer to second airfoil 130B, which is farthest clockwise or to the right in a rear view as in FIGS. 4, 6 and 7. The exact location can be user selected based on, for example, avoiding other structure and locating the stress-relief structure 126 where stress is most prevalent.

Stress relief structure 126 (hereafter "structure 126") may include an end opening 170 defined in radial outer surface 160 of mounting rail 158. End opening 170 may be formed using any technique, for example, milling or wire electric discharge machining (EDM) into radial outer surface 160 of mounting rail 158. End opening 170 extends only partially into mounting rail 158, i.e., only part of its radial extent is above the radially outermost surface of outer endwall 120. Thus, end opening 170 extends through radial outer surface 160 of mounting rail 158 and is open facing in a generally radial outward direction. As shown in FIG. 7, end opening 170 may have a concave shape and a circumferential width W1, which can be selected, for example, to relieve stress while maintaining mounting rail 158 strength. End opening 170 extends from forward surface 162 (FIG. 6) to aft surface 164 of mounting rail 158, i.e., it extends through the entirety of rail thickness T (FIG. 6). End opening 170 is shown with curved corners 172, but this may not be necessary in all cases.

Structure 126 may also include a slot 174 defined through rail thickness T (FIG. 6) of mounting rail 158 and (fluidly) coupled to end opening 170. Slot 174 extends from forward surface 162 to aft surface 164 of mounting rail 158 and is open at a radially outward end 176 (FIG. 7 only) thereof to fluidly communicate with end opening 170. Slot 174 extends generally in a radial direction Z in mounting rail 158, but as can be observed in some of the drawings, it can have some angle relative to radial direction Z. In addition, slot 174 extends generally in a linear fashion in mounting rail 158, but it can have some curvature relative to radial direction Z. Slot 174 may be formed using any technique, for example, wire EDM into mounting rail 158. Slot 174 may have any circumferential width W2 and any radial depth D1 desired to generate a desired stress relief. As shown in FIG. 4, first airfoil 130A is to a first circumferential side of slot 174 (left from the rear view, as shown) and second airfoil 130B is circumferentially spaced from first airfoil 130A to a second circumferential side of slot 174.

Structure 126 also includes an oblong opening 180 defined through rail thickness T of mounting rail 158 and coupled to a radial inner end 182 (FIG. 7) of slot 174. Oblong opening 180, thus, is in fluid communication with slot 174. Oblong opening 180 may have a generally oval or other overall rounded and slightly elongated cross-sectional shape. In one example shown in FIG. 7, oblong opening 180 includes a first circumferentially planar surface 190 extending to a first circumferential side (left side as shown) of slot 174, and a second circumferentially planar surface 192 extending to the second circumferential side (right side as shown) of slot 174. Planar surfaces 190, 192 may be perpendicular to slot 174 and may be radially aligned with one another. A rounded surface 194 may connect first circumferentially planar surface 190 and second circumferentially planar surface 192. Other generally oval shapes in which surfaces 190, 192 are rounded are also possible.

Oblong opening 180 is arranged asymmetrically in a circumferential direction (Y) relative to slot 174. To relieve stress where desired, the asymmetry can take a variety of forms according to various embodiments of the disclosure. The various embodiments can be used individually or collectively. As shown in FIG. 7, stress relief structure 126 (including end opening 170, slot 174, and oblong opening 180) has a cross-section that is the general shape of a wineglass, but with an asymmetric base (i.e., oblong opening 180).

Regarding the shape of oblong opening 180, in one embodiment, oblong opening 180 may be asymmetric by extending in mounting rail 158 more in one circumferential direction than in the other circumferential direction relative to slot 174. More specifically, as shown in FIG. 7, oblong opening 180 may include a first circumferential extent 184 (having circumferential width W3) to the first circumferential side (left as shown) of slot 174 that is smaller than a second circumferential extent 186 (having circumferential width W4) to the second circumferential side (right as shown) of slot 174. Second circumferential extent 186 of oblong opening 180 on the second circumferential side of slot 174 extends closer to second airfoil 130B than first circumferential extent 184 on the first circumferential side of slot 174 extends to first airfoil 130A. In this manner, structure 126 may be configured to relieve stress where it is most prevalent. The circumferential direction in which the larger extent is employed can be switched, if desired. The curvature of oblong opening 180 on either side of slot 174 may be the same or different.

Figure 8:
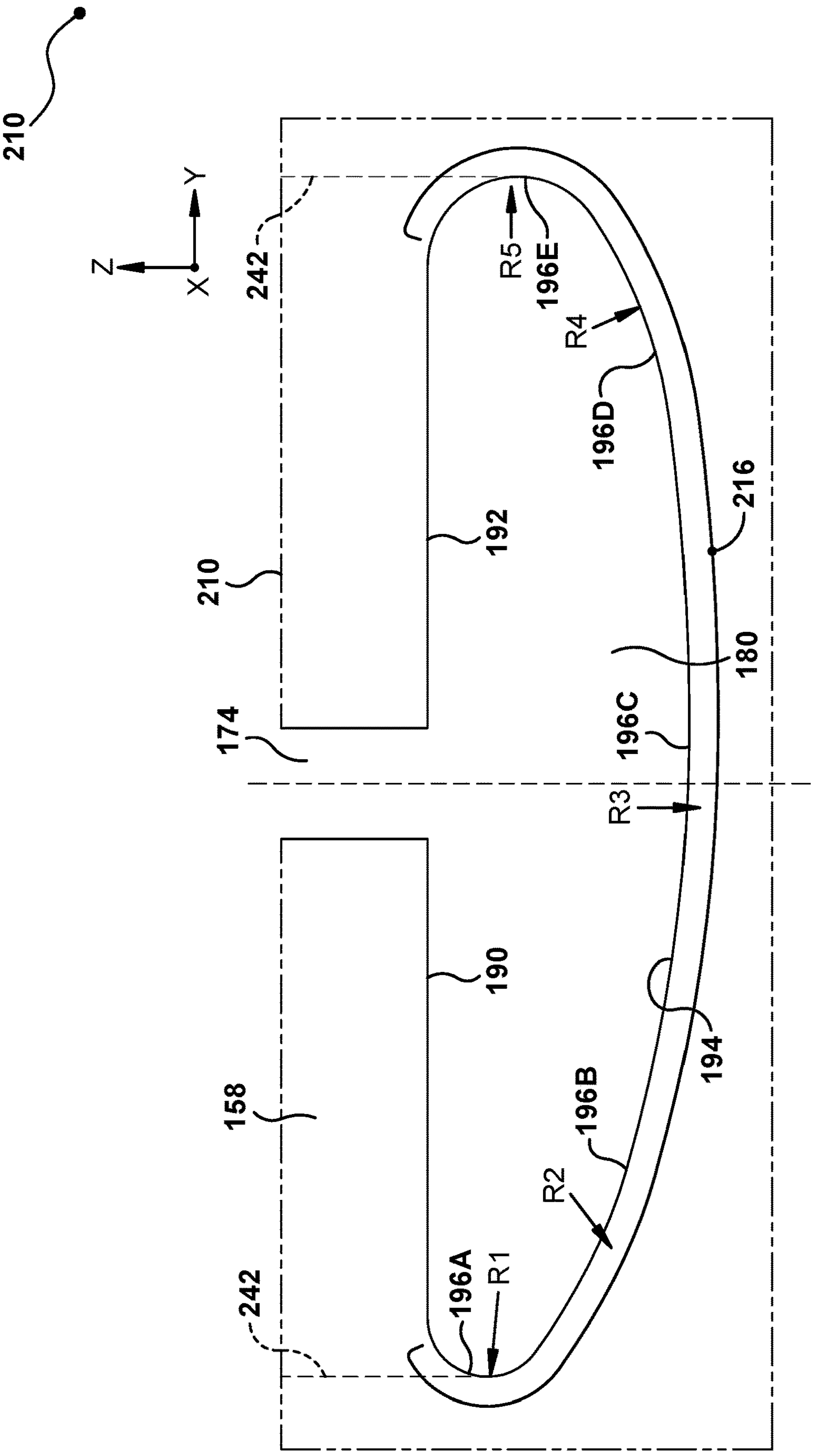
FIG. 8 shows an enlarged rear view of an oblong opening of the stress relief structure, according to embodiments of the disclosure.

In another embodiment, as shown for example in FIG. 8, the asymmetry may be implemented by different shapes of oblong opening 180 on different circumferential sides of slot 174. In this manner, structure 126 may be configured to relieve stress where it is most prevalent. FIG. 8 shows an enlarged rear view of slot 174 and oblong opening 180, according to various embodiments of the disclosure. Here, rounded surface 194 may have different shapes on different sides of slot 174 to form the asymmetry (rather than or in addition to the different extents previously described). For example, rounded surface 194 may include a plurality of connected arced surfaces 196, with two or more arced surfaces having radii having a different radius of curvature (RC). Arced surfaces 196 may be connected to each other (and connected to circumferentially planar surfaces 190, 192, where provided) to form a smooth surface.

Figure 9:
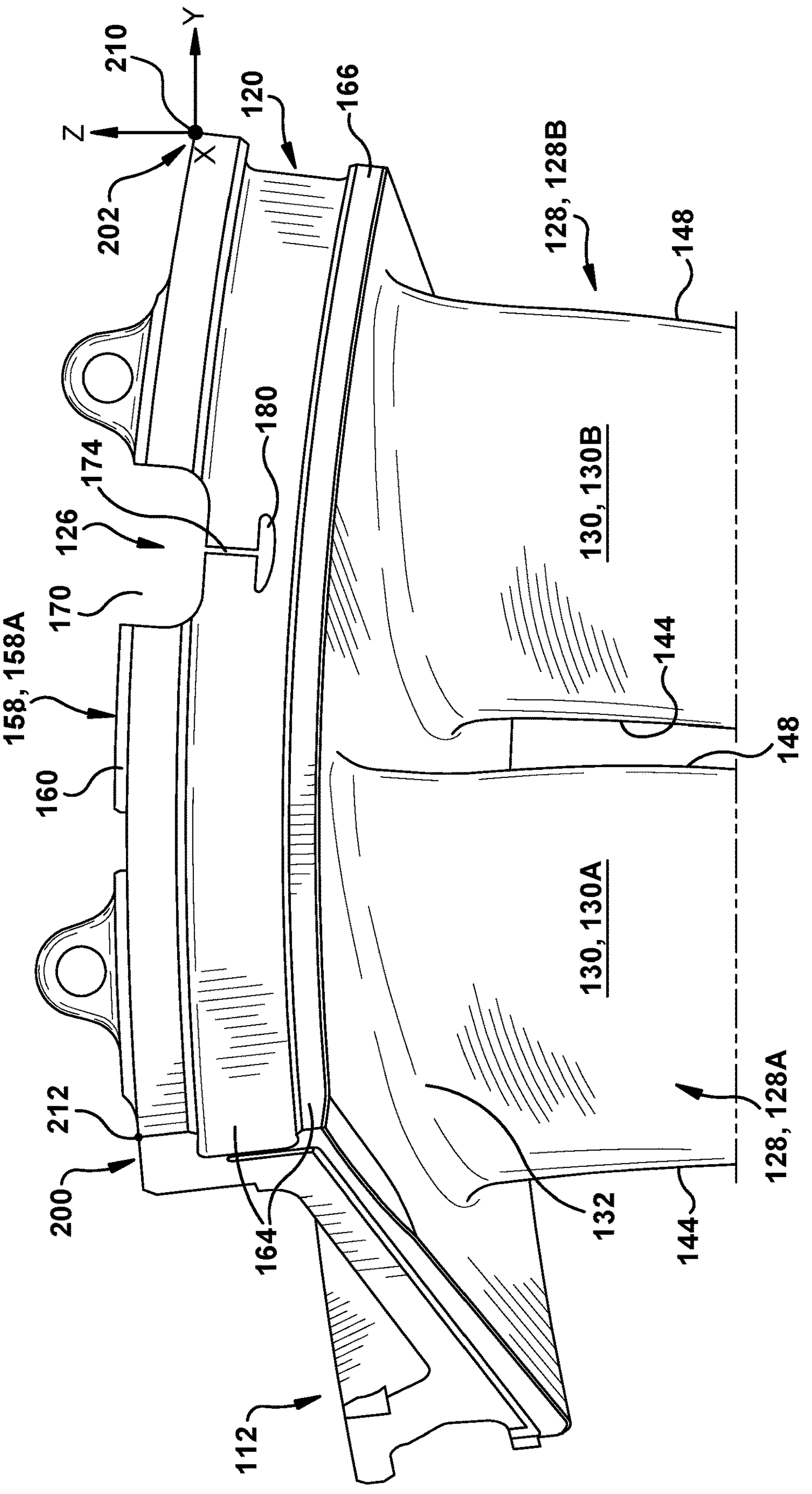
FIG. 9 shows a forward and upward-looking perspective view of a stress relief structure in a mounting rail of a turbine nozzle assembly, according to embodiments of the disclosure.
Figure 11:
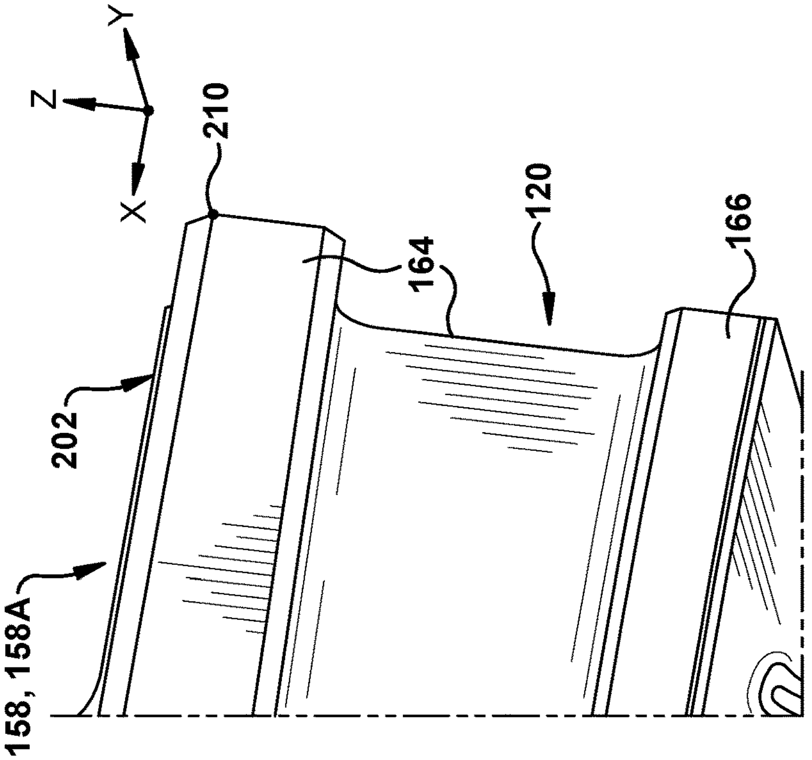
FIG. 11 shows an enlarged perspective view of a pressure side circumferential end of the mounting rail, according to embodiments of the disclosure.
Figure 10:
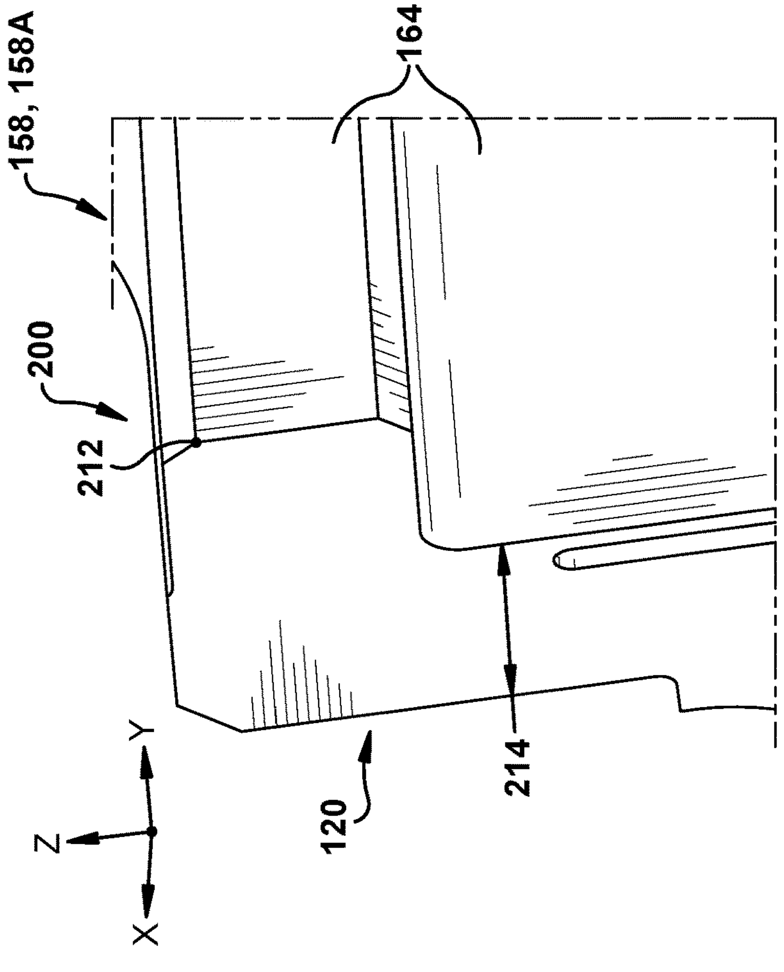
FIG. 10 shows an enlarged perspective view of a suction side circumferential end of the mounting rail, according to embodiments of the disclosure.
Figure 12:
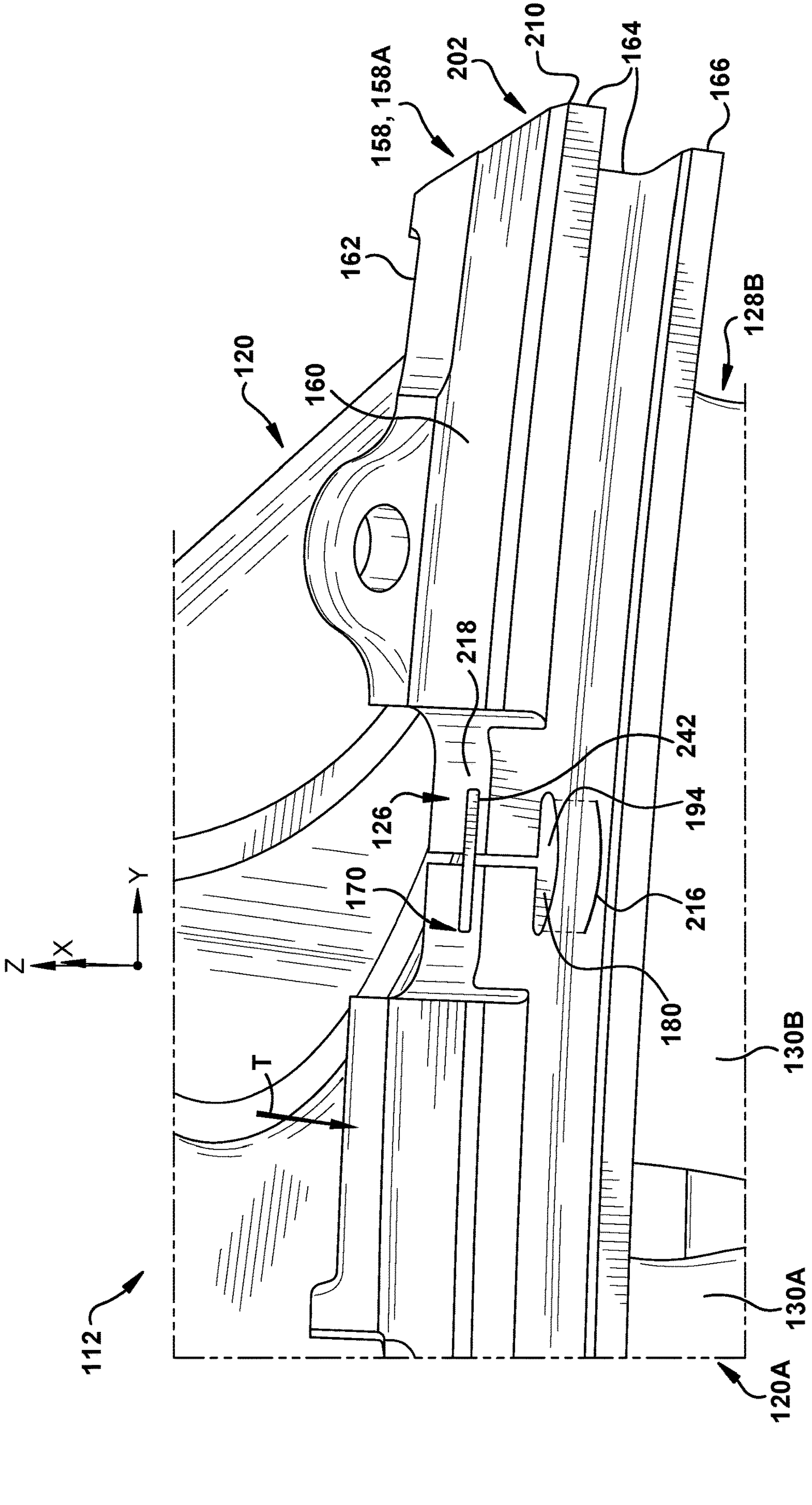
FIG. 12 shows a forward and downward-looking perspective view of a stress relief structure in a mounting rail of a turbine nozzle assembly, according to other embodiments of the disclosure.

The location of arced surfaces 196 will be explained with further reference to FIGS. 9-11. FIG. 9 shows a forward and upward (radial outward) looking perspective view of outer endwall 120 of turbine nozzle assembly 112 including structure 126; FIG. 10 shows an enlarged perspective view of a suction side circumferential end 200 of mounting rail 158; and FIG. 11 shows an enlarged perspective view of a pressure side circumferential end 202 of mounting rail 158. Note, the pressure side and suction side circumferential ends are relative to a direction of airfoil(s) 130 on nozzle assembly 112. As shown in FIGS. 9 and 11, mounting rail 158 includes a rearwardmost point on pressure side, circumferential end 202 thereof that acts as an origin 210, i.e., a reference point for locating the center of curvature of arced surfaces 196 of oblong opening 180. (As will be further described herein, origin 210 also acts as a reference point for a surface profile of a portion 216 of oblong opening 180, which is shown in FIGS. 8 and 12, and which is expressed in terms of Cartesian coordinates). As shown in FIG. 9, the Y-axis extends in a circumferential direction and is parallel to aft surface 164 of mounting rail 158. Hence, the Y-axis also extends through a rearwardmost point 212 on suction side, circumferential end 200 of mounting rail 158.

Returning to FIG. 8, plurality of arced surfaces 196A-E are shown. In the example, five arced surfaces 196A-E are used, but more or fewer arced surfaces 196 are also possible in alternative embodiments. Each arced surface 196A-E has a respective radii R1-5 having a different radius of curvature (RC). The range of radii of curvatures (RC) can be selected to relieve stress, and may vary in one non-limiting example between 1.0 millimeters (mm) to 42.0 mm. In the example shown in FIG. 8, a first arced surface 196A of rounded surface 194 adjacent first circumferentially planar surface 190 may have a first radius of curvature (radius R1) smaller than a second radius of curvature (radius R5) of second arced surface 196E of rounded surface 194 adjacent second circumferentially planar surface 192.

In certain embodiments, stress relief structure 126 in mounting rail 158 may include oblong opening 180 defined through the rail thickness T (FIG. 6) of mounting rail 158 with oblong opening 180 having a portion 216 (FIG. 8) having a shape having a nominal profile defined by a plurality of arced surfaces 196A-E defined substantially in accordance with Cartesian coordinate values of Y and Z and radius of curvature (RC) set forth in TABLE I. The Cartesian coordinates originate at origin 210, i.e., a rearwardmost point on a pressure side, circumferential end of mounting rail 158. The shape projects through rail thickness T (FIG. 6) of mounting rail 158 in a direction parallel to an X-axis of turbine 108 (e.g., per legends in FIGS. 9-11 and into/out of page of FIG. 8). That is, portion 216 of oblong opening 180 has the shape defined by arced surfaces 196A-E in TABLE I and extends through rail thickness T (FIG. 6) of mounting rail 158 (and has the X-wise extent of the rail thickness) in a direction parallel to the X-axis of turbine 108.

The Cartesian coordinate values (Y and Z) and the radius of curvature values are non-dimensional values of from 0% to 100% convertible to distances by multiplying the values by a particular normalizing parameter value expressed in units of distance. That is, the Y and Z values and the radius of curvature values in the tables are percentages of the normalized parameter, so the multiplication of the actual, desired distance of the normalized parameter renders the actual coordinates of center of each arced surface 196A-E for oblong opening 180 for mounting rail 158 having that actual, desired distance of the normalized parameter. Here, as shown in FIG. 10, the normalizing parameter includes a minimum X-wise extent 214 of mounting rail 158, i.e., minimum rail thickness T (FIG. 6). (While shown at suction side circumferential end 200 of mounting rail 158, the actual minimum X-wise extent 214 may be located elsewhere on mounting rail 158). Hence, the actual Y and Z values and the radius of curvature value of each arced surface 196 can be rendered by multiplying values in TABLE I by the actual, desired minimum X-wise extent 214 (e.g., 2.1 centimeters). In any event, the plurality of arced surfaces 196A-E are joined smoothly with one another to form a surface profile of portion 216 of oblong opening 180 through the rail thickness of mounting rail 158 in the direction parallel to the X-axis of turbine 108.

TABLE I

Arced Surfaces for Surface Profile of Portion of Oblong Opening [non-dimensionalized Y and Z values]

| | Radius of Curvature (RC) | Y | Z |
|---|---|---|---|
| R1 (196A) | 0.621 | −7.357 | −0.336 |
| R2 (196B) | 0.769 | −6.897 | 0.201 |
| R3 (196C) | 2.026 | −6.486 | 1.389 |
| R4 (196D) | 0.567 | −6.449 | −0.069 |
| R5 (196E) | 0.097 | −6.243 | −0.492 |

In this example, oblong opening 180 on the first circumferential side (left as shown) of slot 174 relieves more stress than the second side circumferential side (right as shown) using radius R1, and/or a shorter extent 184 of oblong opening 180. Oblong opening 180 can have any asymmetric shape to create a desired stress relief at a desired location in mounting rail 158.

In another embodiment, stress relief structure 126 in mounting rail 158 may include oblong opening 180 defined through rail thickness T (FIG. 6) of mounting rail 158 with oblong opening 180 having a portion 216 (FIG. 8) having a shape having a nominal profile defined substantially in accordance with Cartesian coordinate values of X, Y and Z set forth in TABLE II. The Cartesian coordinates originate at origin 210, i.e., a rearwardmost point on a pressure side, circumferential end of mounting rail 158. The Cartesian coordinate values are non-dimensional values of from 0% to 100% convertible to distances by multiplying the values by a particular normalizing parameter value expressed in units of distance. That is, the X, Y and Z values in TABLE II are percentages of the normalized parameter, so the multiplication of the actual, desired distance of the normalized parameter renders the actual coordinates for portion 216 of oblong opening 180 for mounting rail 158 having that actual, desired distance of the normalized parameter. Here, as shown in FIG. 10, the normalizing parameter includes a minimum X-wise extent 214 of the rail thickness of mounting rail 158. (Again, while shown at suction side circumferential end 200 of mounting rail 158, the actual minimum X-wise extent 214 may be located elsewhere on mounting rail 158). Hence, the actual X, Y and Z values can be rendered by multiplying values in TABLE II by the actual, desired minimum X-wise extent 214 (e.g., 2.1 centimeters). In any event, the X, Y and Z values are joined smoothly with one another to form a surface profile of portion 216 of oblong opening 180, i.e., through the rail thickness of mounting rail 158.

TABLE II

X, Y, Z Values (or Y, Z Values) for Surface Profile of Portion of Oblong Opening [non-dimensionalized X, Y and Z values]

| | X | Y | Z |
|---|---|---|---|
| 1 | 0.826 | −6.376 | −0.632 |
| 2 | 0.826 | −6.401 | −0.635 |
| 3 | 0.826 | −6.426 | −0.636 |
| 4 | 0.826 | −6.451 | −0.637 |
| 5 | 0.826 | −6.475 | −0.637 |
| 6 | 0.826 | −6.500 | −0.637 |
| 7 | 0.826 | −6.525 | −0.636 |
| 8 | 0.826 | −6.550 | −0.636 |
| 9 | 0.826 | −6.574 | −0.634 |
| 10 | 0.826 | −6.599 | −0.633 |
| 11 | 0.826 | −6.624 | −0.632 |
| 12 | 0.826 | −6.649 | −0.630 |

TABLE II-continued

| X, Y, Z Values (or Y, Z Values) for Surface Profile of Portion of Oblong Opening [non-dimensionalized X, Y and Z values] | | | |
|---|---|---|---|
| | X | Y | Z |
| 13 | 0.826 | −6.673 | −0.628 |
| 14 | 0.826 | −6.698 | −0.627 |
| 15 | 0.826 | −6.723 | −0.624 |
| 16 | 0.826 | −6.747 | −0.623 |
| 17 | 0.826 | −6.772 | −0.620 |
| 18 | 0.826 | −6.797 | −0.616 |
| 19 | 0.826 | −6.821 | −0.613 |
| 20 | 0.826 | −6.846 | −0.608 |
| 21 | 0.826 | −6.870 | −0.603 |
| 22 | 0.826 | −6.894 | −0.596 |
| 23 | 0.826 | −6.918 | −0.590 |
| 24 | 0.826 | −6.942 | −0.584 |
| 25 | 0.826 | −6.966 | −0.578 |
| 26 | 0.826 | −6.990 | −0.571 |
| 27 | 0.826 | −7.014 | −0.565 |
| 28 | 0.826 | −7.038 | −0.559 |
| 29 | 0.826 | −7.062 | −0.553 |
| 30 | 0.826 | −7.085 | −0.545 |
| 31 | 0.826 | −7.109 | −0.539 |
| 32 | 0.826 | −7.133 | −0.531 |
| 33 | 0.826 | −7.156 | −0.523 |
| 34 | 0.826 | −7.179 | −0.514 |
| 35 | 0.826 | −7.202 | −0.504 |
| 36 | 0.826 | −7.225 | −0.494 |
| 37 | 0.826 | −7.247 | −0.483 |
| 38 | 0.826 | −7.268 | −0.471 |
| 39 | 0.826 | −7.290 | −0.457 |
| 40 | 0.826 | −7.310 | −0.445 |
| 41 | 0.826 | −7.331 | −0.430 |
| 42 | 0.826 | −7.351 | −0.415 |
| 43 | 0.826 | −7.371 | −0.401 |
| 44 | 0.826 | −7.389 | −0.383 |
| 45 | 0.826 | −7.406 | −0.366 |
| 46 | 0.826 | −7.419 | −0.345 |
| 47 | 1.574 | −6.376 | −0.632 |
| 48 | 1.574 | −6.401 | −0.635 |
| 49 | 1.574 | −6.426 | −0.636 |
| 50 | 1.574 | −6.451 | −0.637 |
| 51 | 1.574 | −6.475 | −0.637 |
| 53 | 1.574 | −6.500 | −0.637 |
| 54 | 1.574 | −6.525 | −0.636 |
| 54 | 1.574 | −6.550 | −0.636 |
| 55 | 1.574 | −6.574 | −0.634 |
| 56 | 1.574 | −6.599 | −0.633 |
| 57 | 1.574 | −6.624 | −0.632 |
| 58 | 1.574 | −6.649 | −0.630 |
| 59 | 1.574 | −6.673 | −0.628 |
| 60 | 1.574 | −6.698 | −0.627 |
| 61 | 1.574 | −6.723 | −0.624 |
| 62 | 1.574 | −6.747 | −0.623 |
| 63 | 1.574 | −6.772 | −0.620 |
| 64 | 1.574 | −6.797 | −0.616 |
| 65 | 1.574 | −6.821 | −0.613 |
| 66 | 1.574 | −6.846 | −0.608 |
| 67 | 1.574 | −6.870 | −0.603 |
| 68 | 1.574 | −6.894 | −0.596 |
| 69 | 1.574 | −6.918 | −0.590 |
| 70 | 1.574 | −6.942 | −0.584 |
| 71 | 1.574 | −6.966 | −0.578 |
| 72 | 1.574 | −6.990 | −0.571 |
| 73 | 1.574 | −7.014 | −0.565 |
| 74 | 1.574 | −7.038 | −0.559 |
| 75 | 1.574 | −7.062 | −0.553 |
| 76 | 1.574 | −7.085 | −0.545 |
| 77 | 1.574 | −7.109 | −0.539 |
| 78 | 1.574 | −7.133 | −0.531 |
| 79 | 1.574 | −7.156 | −0.523 |
| 80 | 1.574 | −7.179 | −0.514 |
| 81 | 1.574 | −7.202 | −0.504 |
| 82 | 1.574 | −7.225 | −0.494 |
| 83 | 1.574 | −7.247 | −0.483 |
| 84 | 1.574 | −7.268 | −0.471 |
| 85 | 1.574 | −7.290 | −0.457 |
| 86 | 1.574 | −7.310 | −0.445 |
| 87 | 1.574 | −7.331 | −0.430 |
| 88 | 1.574 | −7.351 | −0.415 |
| 89 | 1.574 | −7.371 | −0.401 |
| 90 | 1.574 | −7.389 | −0.383 |
| 91 | 1.574 | −7.406 | −0.366 |
| 92 | 1.574 | −7.419 | −0.345 |

Referring to FIG. 12, in another embodiment, stress relief structure 126 in mounting rail 158 may include oblong opening 180 defined through rail thickness T of mounting rail 158 with oblong opening 180 having portion 216 having a shape with a nominal profile defined substantially in accordance with Cartesian coordinate values of Y and Z set forth in TABLE II. The Cartesian coordinates originate at origin 210, i.e., a rearwardmost point on a pressure side, circumferential end of mounting rail 158. As shown in FIG. 12, the shape of portion 216 projects through rail thickness T of mounting rail 158 in a direction parallel to an X-axis of the turbine 108 (e.g., per legend in FIG. 12). That is, portion 216 of oblong opening 180 has the shape defined by the Y and Z values in TABLE II and extends through rail thickness T of mounting rail 158 (and has the varying X-wise extent of the potentially varying rail thickness T) in a direction parallel to the X-axis of turbine 108. Here, the X coordinates in TABLE II are ignored, and the X-wise extent of portion 216 of oblong opening 180 is defined by potentially varying rail thickness T of mounting rail 158 in a direction parallel to the X-axis of turbine 108.

The Cartesian coordinate values are non-dimensional values of from 0% to 100% convertible to distances by multiplying the values by a particular normalizing parameter value expressed in units of distance. That is, again, the Y and Z values in TABLE II are percentages of the normalized parameter, so the multiplication of the actual, desired distance of the normalized parameter renders the actual coordinates for portion 216 of oblong opening 180 for mounting rail 158 having that actual, desired distance of the normalized parameter. Here again, as shown in FIG. 10, the normalizing parameter includes a minimum X-wise extent 214 of the rail thickness of mounting rail 158. (As noted, while shown at suction side circumferential end 200 of mounting rail 158, the actual minimum X-wise extent 214 may be located elsewhere on mounting rail 158). Hence, the actual Y and Z values can be rendered by multiplying values in TABLE II by the actual, desired minimum X-wise extent 214 (e.g., 2.1 centimeters). In any event, the Y and Z values are joined smoothly with one another to form a surface profile of portion 216 of oblong opening 180 through rail thickness T of mounting rail 158 in the direction parallel to the X-axis of turbine 108 (FIG. 3).

As noted, the values in the various tables described herein are non-dimensionalized values generated and shown to three decimal places for determining the nominal profile of the various surfaces at ambient, non-operating, or non-hot conditions, and do not take any coatings or fillets into account, though embodiments could account for other conditions, coatings, and/or fillets. In certain embodiments, to allow for typical manufacturing tolerances and/or coating thicknesses, ±values can be added to the normalization parameter, i.e., minimum X-wise extent 214 of mounting rail 158. For example, in one embodiment, a tolerance of +/−15 percent can be applied to minimum X-wise extent 214 of mounting rail 158 to define an envelope for the surface profile for a stress relief structure at cold or room temperature.

In other embodiments, to allow for typical manufacturing tolerances and/or coating thicknesses, ±values can be added to the values listed in the tables. For example, in one embodiment, a tolerance of +/−15 percent of a thickness of direction normal to any surface can define a profile envelope for a stress relief structure at cold or room temperature. In other words, a distance of 15 percent of a thickness in a direction normal to any surface along the surface profile can define a range of variation between measured points on an actual surface and ideal positions of those points, particularly at a cold or room temperature, as embodied by the disclosure. In another embodiment, a tolerance of +/−20 percent of a thickness of direction normal to any surface can define a profile envelope for the stress relief structure at cold or room temperature. The surface profiles, as embodied herein, are robust to these ranges of variation without impairment of mechanical and aerodynamic functions.

With further regard to the various embodiments of the shape of oblong opening 180 and/or portion 216, the arced surfaces 196 and/or data points listed in the tables may be joined smoothly with one another (with lines and/or arcs) to form a surface profile for portion 216 of oblong opening 180 and/or oblong opening 180, using any now known or later developed curve fitting technique generating a curved surface appropriate for nozzle assembly 112 and/or mounting rail 158. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

Figure 13:
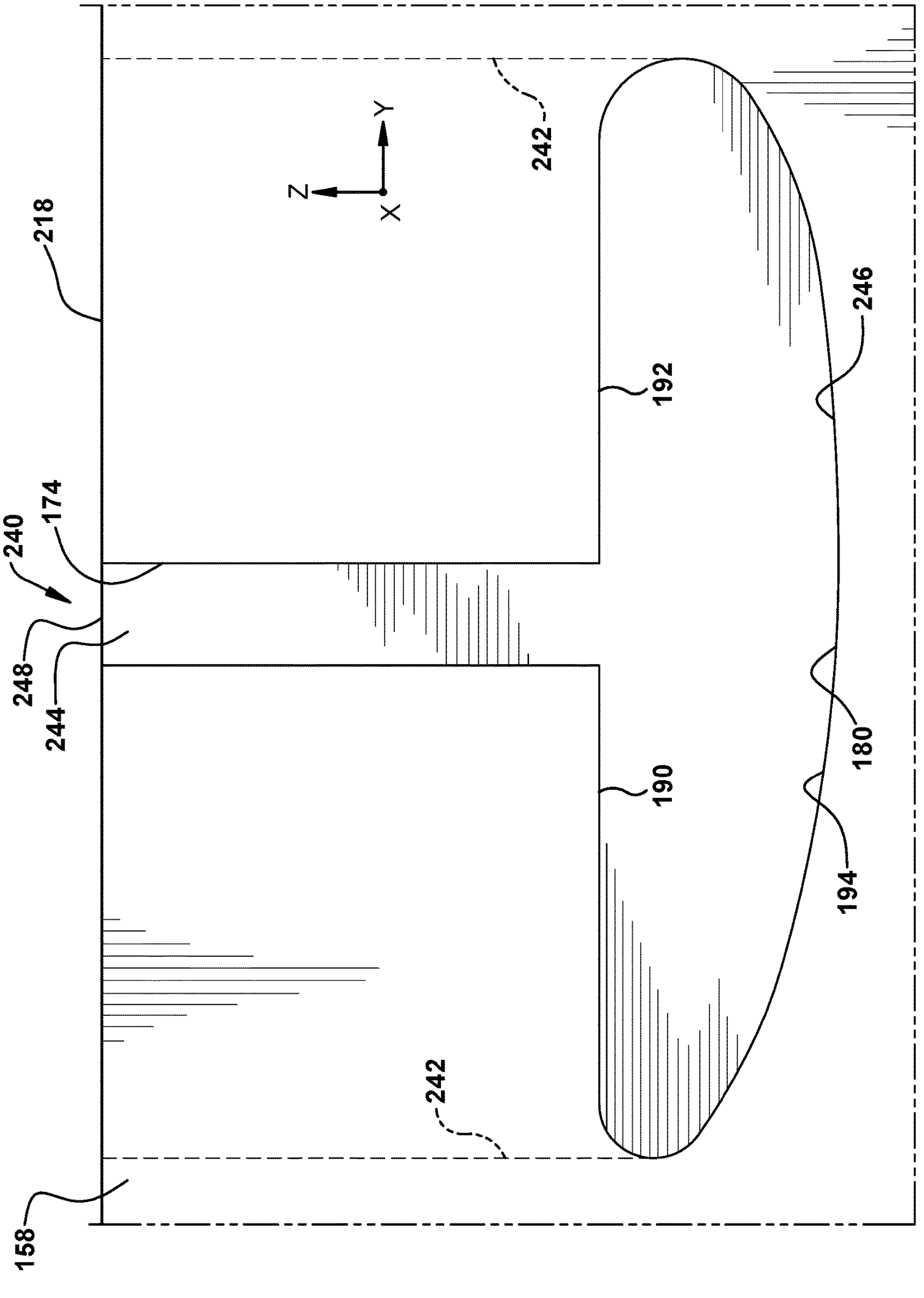
FIG. 13 shows a rear view of a stress relief structure in a mounting rail of a turbine nozzle assembly including a seal plate therein, according to embodiments of the disclosure.

Referring again to FIG. 6, turbine nozzle assembly 112 also has cooling fluid 230 directed by outer endwall 120 and mounting rail(s) 158 to internal parts of airfoil 130, i.e., through apertures 232 in outer endwall 120 that are in fluid communication with an interior of airfoil 130. FIGS. 6 and 7 show a seal system 240, according to embodiments of the disclosure, in a non-assembled form. FIG. 13 shows a rear view of stress relief structure 126, similar to FIG. 7, but showing stress relief structure 126 of turbine nozzle assembly 112 (FIG. 6) including seal system 240 in an assembled form. With reference to FIGS. 6, 7 and 13, seal system 240 seals a space axially aft of mounting rail 158 from a space axially forward (along axis X) of mounting rail 158 to separate cooling fluid 230 from the hotter working fluid of turbine 108 (FIG. 3). To this end, turbine nozzle assembly 112 includes a seal slot 242 located (in end opening 170 of mounting rail 158) between forward surface 162 and aft surface 164 of mounting rail 158 and extending circumferentially across slot 174 and oblong opening 180. Seal slot 242 is shown best in FIG. 6 and is shown with dashed lines in FIGS. 7 and 13. Seal slot 242 is open circumferentially to slot 174 and open radially above oblong opening 180. Seal slot 242 may be formed using any technique, for example, wire EDM into mounting rail 158.

Turbine nozzle assembly 112 may also include a planar seal 244 positioned in seal slot 242. Planar seal 244 is sized and shaped to slide and fit radially into seal slot 242 and includes a radially inner edge 246 shaped to match rounded surface 194 of oblong opening 180, e.g., part of portion 216 (FIG. 8) thereof. Planar seal 244 can be introduced into seal slot 242 through end opening 170. Planar seal 244 includes a radial outer edge 248 that is coplanar with a bottom surface 218 of end opening 170. It will be understood that another seal (not shown) between turbine nozzle assembly 112 and a shroud 250 (FIG. 3) that is radially outward of an end of a rotating blade 114 (FIG. 3) covers end opening 170 across aft surface 164 of mounting rail 158A. In this manner, with the nozzle assembly and shroud seal (not shown), planar seal 244 can prevent fluid communication through slot 174 and oblong opening 180. With mounting rail(s) 158 and outer endwall 120, seal system 240 and nozzle assembly 112 and shroud seal (not shown) protect cooling fluid 230 from hotter working fluids of turbine 108 (FIG. 3).

With reference again to FIG. 3, in various embodiments, turbine nozzle assembly 112 can be in a first stage (L0) nozzle, second stage (L1) nozzle, third stage (L2) nozzle, or fourth stage (L3) nozzle. In particular embodiments, turbine nozzle assembly 112 is in a second stage (L1) nozzle of turbine 108, and a stress relief structure 126 in nozzle assembly 112 allows second stage (L1) nozzle to withstand stress therein at the second stage. In various embodiments, turbine 108 can include a set of nozzles 112 in only first stage (L0) of turbine 108, or in only third stage (L2), or in only fourth stage (L3) of turbine 108.

Embodiments of the disclosure provide a turbine nozzle assembly with a mounting rail stress relief structure that provides more precise stress relief, where needed. In one non-limiting example, the stress relief structure reduced the chance of cracking of the mounting rail within a maintenance interval to 15% from a typical 90%. Stress relief structure may also provide stress relief to adjacent structure of mounting rail such as but not limited to the trailing edge of the nozzle.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A turbine nozzle assembly, comprising:

at least one airfoil;

an outer endwall coupled to a radial outer end of the at least one airfoil;

a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including:

an end opening defined in the radial outer surface of the mounting rail;

a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot and including:

a first arced surface at a first end of a longitudinal direction of the oblong opening, and a second arced surface at a second end of the longitudinal direction opposite the first end, wherein the first arced surface and the second arced surface have different radii of curvature.

2. The turbine nozzle assembly of claim 1, wherein the at least one airfoil includes a first airfoil to a first circumferential side of the slot, and a second airfoil circumferentially spaced from the first airfoil to a second circumferential side of the slot, wherein the stress relief structure is circumferentially closer to the second airfoil than the first airfoil.

3. The turbine nozzle assembly of claim 2, wherein the oblong opening includes a first circumferential extent to the first circumferential side of the slot that is smaller than a second circumferential extent to the second circumferential side of the slot.

4. The turbine nozzle assembly of claim 2, wherein the oblong opening includes:

a first planar surface extending circumferentially to the first circumferential side of the slot;

a second planar surface extending circumferentially to the second circumferential side of the slot; and a rounded surface including the first arced surface and the second arced surface, wherein the rounded surface connects the first planar surface and the second planar surface.

5. The turbine nozzle assembly of claim 4, wherein the rounded surface includes a plurality of connected arced surfaces between the first arced surface and the second arced surface, each arced surface having a different radius of curvature.

6. The turbine nozzle assembly of claim 5, wherein the first arced surface of the rounded surface is adjacent the first planar surface and has a first radius of curvature smaller than a second radius of curvature of the second arced surface of the rounded surface, the second arced surface being adjacent the second planar surface.

7. The turbine nozzle assembly of claim 1, further comprising:

a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

8. The turbine nozzle assembly of claim 1, wherein the mounting rail is coupled to the outer endwall adjacent an axially trailing edge of the outer endwall.

9. The turbine nozzle assembly of claim 1, wherein the turbine nozzle assembly is in a second stage of a turbine system.

10. A turbine nozzle assembly, comprising:

a first airfoil adjacent a second airfoil;

an inner endwall coupled to a radial inner end of the first airfoil and the second airfoil;

an outer endwall coupled to a radial outer end of the first airfoil and the second airfoil;

a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including:

an end opening defined in the radial outer surface of the mounting rail;

a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot and including a pair of arced surfaces on opposing sides of a longitudinal direction of the oblong opening, wherein the arced surfaces in the pair of arced surfaces have different radii of curvature.

11. The turbine nozzle assembly of claim 10, wherein the first airfoil is to a first circumferential side of the slot, and the second airfoil is circumferentially spaced from the first airfoil and to a second circumferential side of the slot, wherein the stress relief structure is circumferentially closer to the second airfoil than the first airfoil.

12. The turbine nozzle assembly of claim 11, wherein the oblong opening includes a first circumferential extent to the first circumferential side of the slot that is smaller than a second circumferential extent to the second circumferential side of the slot.

13. The turbine nozzle assembly of claim 11, wherein the oblong opening includes:

a first planar surface extending circumferentially to the first circumferential side of the slot;

a second planar surface extending circumferentially to the second circumferential side of the slot; and a rounded surface including the pair of arced surfaces, wherein the rounded surface connects the first planar surface and the second planar surface.

14. The turbine nozzle assembly of claim 13, wherein the rounded surface includes a plurality of connected arced surfaces between the pair of arced surfaces, each arced surface in the plurality of connected arced surfaces having a different radius of curvature.

15. The turbine nozzle assembly of claim 14, wherein a first arced surface in the pair of arced surfaces is adjacent the first planar surface and has a first radius of curvature smaller than a second radius of curvature of a second arced surface in the pair of arced surfaces, the second arced surface being adjacent the second planar surface.

16. The turbine nozzle assembly of claim 10, further comprising:

a seal slot located between a forward surface and an aft surface of the mounting rail and extending circumferentially across the slot and the oblong opening; and a planar seal positioned in the seal slot, the planar seal having an edge shaped to match a rounded surface of the oblong opening.

17. The turbine nozzle assembly of claim 10, wherein the mounting rail is coupled to the outer endwall adjacent an axially trailing edge of the outer endwall.

18. The turbine nozzle assembly of claim 10, wherein the turbine nozzle assembly is in a second stage of a turbine system.

19. A turbine system, comprising:

a plurality of nozzle stages, at least one nozzle stage of the plurality of nozzle stages including at least one turbine nozzle assembly comprising:

at least one airfoil;

an inner endwall coupled to a radial inner end of the at least one airfoil;

an outer endwall coupled to a radial outer end of the at least one airfoil;

a mounting rail coupled to the outer endwall, the mounting rail extending at least partially radially outward from the outer endwall and at least partially circumferentially along the outer endwall, the mounting rail having a radial outer surface and a rail thickness; and a stress relief structure defined in the mounting rail, the stress relief structure including:

an end opening defined in the radial outer surface of the mounting rail;

a slot defined through the rail thickness of the mounting rail and coupled to the end opening; and an oblong opening defined through the rail thickness of the mounting rail and coupled to a radial inner end of the slot, the oblong opening being arranged asymmetrically in a circumferential direction relative to the slot and including:

a first arced surface at a first end of a longitudinal direction of the oblong opening, and a second arced surface at a second end of the longitudinal direction opposite the first end, wherein the first arced surface and the second arced surface have different radii of curvature.

20. The turbine system of claim 19, wherein the at least one nozzle stage includes a second stage of the turbine system.

* * * * *